United States Patent
Plante et al.

(10) Patent No.: US 9,679,424 B2
(45) Date of Patent: *Jun. 13, 2017

(54) DISTRIBUTED VEHICLE EVENT RECORDER SYSTEMS HAVING A PORTABLE MEMORY DATA TRANSFER SYSTEM

(71) Applicant: SmartDrive Systems, Inc., San Diego, CA (US)

(72) Inventors: James Plante, Del Mar, CA (US); Ramesh Kasavaraju, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,247

(22) Filed: Nov. 6, 2015

(65) Prior Publication Data

US 2016/0063775 A1    Mar. 3, 2016

Related U.S. Application Data

(63) Continuation of application No. 14/036,299, filed on Sep. 25, 2013, now Pat. No. 9,183,679, which is a
(Continued)

(51) Int. Cl.
*H04N 5/77* (2006.01)
*G07C 5/08* (2006.01)
(Continued)

(52) U.S. Cl.
CPC ............... *G07C 5/085* (2013.01); *B60R 1/00* (2013.01); *G06K 9/00791* (2013.01); *G07C 5/00* (2013.01);
(Continued)

(58) Field of Classification Search
CPC ...... B60W 2050/0089; G06K 9/00791; H04N 21/2747; H04N 21/41422; H04N 21/4223
(Continued)

(56) References Cited

U.S. PATENT DOCUMENTS 2,943,141 A    6/1960    Knight
3,634,866 A    1/1972    Meyer
(Continued)

FOREIGN PATENT DOCUMENTS

CA    2469728       12/2005
CA    2469728 A1    12/2005
(Continued)

OTHER PUBLICATIONS

PCT International Search Report and Written Opinion for PCT/US15/60721 dated Feb. 26, 2016, 11 pages.
(Continued)

*Primary Examiner* — Dalena Tran
(74) *Attorney, Agent, or Firm* — Sheppard Mullin Richter & Hampton LLP

(57) ABSTRACT

Data transfer systems for vehicle event recorders are provided as: a vehicle event recorder, a vehicle event recorder resident memory, and upload module in conjunction with, a communication port suitable for coupling with, a portable memory device, a server computer datastore, a server download module in conjunction with, a similar cooperating communications port. The portable memory device is arranged to operably couple with the communications ports of both the vehicle event recorder and the server computer and to be repeatedly moved between the two. The upload/download modules are arranged to transfer data to/from the portable memory in an orderly fashion in which no files are removed from the vehicle event recorder resident memory without first having been successfully transferred to the server computer datastore.

12 Claims, 4 Drawing Sheets

Related U.S. Application Data continuation of application No. 13/539,312, filed on Jun. 30, 2012, now Pat. No. 8,571,755, which is a continuation of application No. 11/800,876, filed on May 8, 2007, now Pat. No. 8,239,092.

(51) Int. Cl.

| | | |
|---|---|---|
| H04N 5/76 | (2006.01) | |
| H04N 7/173 | (2011.01) | |
| H04N 21/2747 | (2011.01) | |
| H04N 21/414 | (2011.01) | |
| H04N 21/4223 | (2011.01) | |
| G07C 5/00 | (2006.01) | |
| B60R 1/00 | (2006.01) | |
| G06K 9/00 | (2006.01) | |
| B60W 50/00 | (2006.01) | |

(52) U.S. Cl.
CPC ............ *H04N 5/76* (2013.01); *H04N 5/77* (2013.01); *H04N 7/173* (2013.01); *H04N 21/2747* (2013.01); *H04N 21/41422* (2013.01); *H04N 21/4223* (2013.01); *B60W 2050/0089* (2013.01)

(58) Field of Classification Search
USPC ....... 701/33.4, 32.2, 31.5, 33.3, 36; 340/439
See application file for complete search history.

(56) References Cited

U.S. PATENT DOCUMENTS

| | | |
|---|---|---|
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis, Jr. |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | dAlayer |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hu/tter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhauser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | VanBlessinger |
| 5,140,436 A | 8/1992 | Blessinger |
| 5,140,438 A | 8/1992 | Kurahashi |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio, IV |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley, Jr. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A * | 3/1996 | Ousborne ............ G07C 5/0858 340/439 |
| 5,504,482 A | 4/1996 | Schreder |
| 5,513,011 A | 4/1996 | Matsumoto |

(56) References Cited

U.S. PATENT DOCUMENTS

| | | | |
|---|---|---|---|
| 5,515,285 A | 5/1996 | Garrett, Sr. |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant, Jr. |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | VanRyzin |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |

(56) References Cited

U.S. PATENT DOCUMENTS

| | | |
|---|---|---|
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 * | 12/2004 | Boykin .................. H04N 7/181 340/539.1 |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,398,140 B2 | 7/2008 | Kernwein |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,853,376 B2 | 12/2010 | Peng |

(56) References Cited

U.S. PATENT DOCUMENTS

| | | |
|---|---|---|
| 7,868,912 B2 | 1/2011 | Venetianer |
| 7,893,958 B1 | 2/2011 | DAgostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0135979 A1 | 7/2004 | Hazelton |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |

(56) References Cited

U.S. PATENT DOCUMENTS

| | | |
|---|---|---|
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0217670 A1 | 9/2007 | Bar-Am |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | deMiranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard |
| 2008/0319604 A1 | 12/2008 | Follmer |

(56) References Cited

U.S. PATENT DOCUMENTS

| | | |
|---|---|---|
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0172864 A1 | 7/2011 | Syed |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0203402 A1 | 8/2012 | Jape |
| 2012/0210252 A1 | 8/2012 | Fedoseyeva |
| 2012/0269383 A1 | 10/2012 | Bobbitt |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0018534 A1 | 1/2013 | Hilleary |
| 2013/0021148 A1 | 1/2013 | Cook |
| 2013/0030660 A1 | 1/2013 | Fujimoto |
| 2013/0048795 A1 | 2/2013 | Cross |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0145269 A1 | 6/2013 | Latulipe |
| 2013/0151980 A1 | 6/2013 | Lee |
| 2013/0197774 A1 | 8/2013 | Denson |
| 2013/0209968 A1 | 8/2013 | Miller |
| 2013/0274950 A1 | 10/2013 | Richardson |
| 2013/0317711 A1 | 11/2013 | Plante |
| 2013/0332004 A1 | 12/2013 | Gompert |
| 2013/0345927 A1 | 12/2013 | Cook |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0094992 A1 | 4/2014 | Lambert |
| 2014/0098228 A1 | 4/2014 | Plante |
| 2014/0152828 A1 | 6/2014 | Plante |
| 2014/0226010 A1 | 8/2014 | Molin |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2014/0339374 A1 | 11/2014 | Mian |
| 2015/0000415 A1 | 1/2015 | Kelley |
| 2015/0022449 A1 | 1/2015 | Cheng |
| 2015/0035665 A1 | 2/2015 | Plante |
| 2015/0057836 A1 | 2/2015 | Plante |
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0189042 A1 | 7/2015 | Sun |
| 2015/0203116 A1 | 7/2015 | Fairgrieve |
| 2015/0317846 A1 | 11/2015 | Plante |
| 2015/0371462 A1 | 12/2015 | Ramesh |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 6/1998 |
| EP | 1170697 A2 | 1/2002 |

(56) References Cited

FOREIGN PATENT DOCUMENTS

| | | | |
|---|---|---|---|
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 244694 | 8/2008 |
| GB | 2451485 | 2/2009 |
| GB | 2447184 B | 6/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| JP | 5294188 | 9/2013 |
| KR | 1000588169 | 6/2006 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0048033 | 2/2000 |
| WO | 0077620 | 2/2000 |
| WO | 0028410 A1 | 5/2000 |
| WO | 0123214 | 4/2001 |
| WO | 0125054 | 4/2001 |
| WO | 0146710 A2 | 6/2001 |
| WO | 03045514 | 6/2003 |
| WO | 2005095175 A1 | 10/2005 |
| WO | 2006022824 | 3/2006 |
| WO | 2006022824 A2 | 3/2006 |
| WO | 2007067767 | 1/2007 |
| WO | 2007109091 | 9/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

Drivecam.com as retrieved by the Internet Wayback Machine as of Mar. 5, 2005(1 pg.).
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011. (6 pgs.).
Driver Feedback System, Jun. 12, 2001 (1 pg.).
European Examination Report issued in EP 07772812.9 on Jan. 22, 2015; 5 pages.
First Amended Answer to Amended Complaint and First Amended Counterclaims; and Demand for Jury Trial in *DriveCam, Inc.* v. *SmartDrive Systems, Inc.*, Case No. 3:11 -CV-00997 H (RBB), for the Southern District of California, Exhibit A, Document 55, filed Jan. 3, 2012, pp. 49-103.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 3, 2012, pp. 86-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4- 24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413- 430 (2007); Digital Object Identifier 10,1109/TITS2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001. (19 pgs.).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'HindSight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY &Categorys- ub.--Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet, Oct. 26, 2001 (2 pgs.).
International Search Report and Written Opinion issued in PCT/US07/68325 on Feb. 27, 2008. (10 pgs.).
International Search Report and Written Opinion issued in PCT/US07/68325 on Feb. 27, 2008. (2 pgs.).
International Search Report and Written Opinion issued in PCT/US07/68328 on Oct. 15, 2007. (2 pgs.).
International Search Report and Written Opinion issued in PCT/US07/68329 on Mar. 3, 2008. (10 pgs.).
International Search Report and Written Opinion issued in PCT/US07/68332 on Mar. 3, 2008. (8 pgs.).
International Search Report and Written Opinion issued in PCT/US07/68334 on Mar. 5, 2008. (11 pgs.).
International Search Report for PCTUS2006/47055, mailed Mar. 20, 2008 (2 pages).
International Search Report issued in PCT/US2006/47042 mailed Feb. 25, 2008 (3pgs.).
J. Gallagher, 'Lancer Recommends Tech Tool', Insurance and Technology Magazine, Feb. 2002 (1 pg.).
Jean (DriveCam vendor) "DriveCam Driving Feedback System", DriveCam brochure, Nov. 6, 2002, Document #6600128-1, 2 pages.
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).

(56) References Cited

OTHER PUBLICATIONS

Jean (DriveCam vendor), 'Hindsight 20-20 Data Sheet', Nov. 4, 2002 (2 pg.).
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Worksheet in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
Joint Motion for Leave to Supplement Disclosure of Asserted Claims and Preliminary Infringement Contentions in *DriveCam, Inc. v. SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infrared Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002. (15 pgs.).
Karen, 'Managers Guide to the DriveCam Driving Feedback System', Jul. 30, 2002 (11 pgs.).
Kathy Latus (Latus Design), 'Case Study—Time Warner Cable', Sep. 23, 2005. (1 pg.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995). (4 pgs.).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003 (2 pgs.).
Inovate Motorsports, OT-1 16 Channel 0BD-II Interface User Manual, Version 1.0, Nov. 28, 2007, pp. 3, 4, 21 and 27.

Miller, D.P., Evaluation of Vision Systems for Teleoperated Land Vehicles. Control Systems Magazine, IEEE, 8 (3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS2008.922943.
Notice of Allowance U.S. Appl. No. 11/566,424, mailed Feb. 26, 2010, 6 pages.
Notice of Allowance for U.S. Appl. No. 11/377,164, mailed Dec. 3, 2014, 5 pages.
Notice of Allowance for U.S. Appl. No. 11/377,164, mailed Feb. 13, 2015, 2 pages.
Notice of Allowance for U.S. Appl. No. 11/377,164, mailed Feb. 25, 2014, 2 pages.
Notice of Allowance for U.S. Appl. No. 11/377,164, mailed Nov. 18, 2013, 7 pages.
Notice of Allowance for U.S. Appl. No. 11/377,167, mailed Apr. 1, 2015, 7 pages.
Notice of Allowance for U.S. Appl. No. 11/800,876, mailed Apr. 19, 2012, 8 pages.
Notice of Allowance for 13/957,810, mailed Jun. 8, 2015, 10 pages.
Panasonic Corporation, Video Cassette Recorder (VCR) Operating Instructions for Models No. PV-V4020/PV-V4520. (40 pgs.).
Passenger Transportation Mode Brochure, May 2, 2005. (2 pgs.).
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983) (1 pg.).
Patent Abstracts of Japan vol. 011, No. 292 (E-543), Sep. 19, 1987 (Sep. 19, 1987) & JP 62 091092 A (OK ENG:KK), Apr. 25, 1987 (Apr. 25, 1987) (1 pg.).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987) (1 pg.).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990) (1 pg.).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992) (1 pg.).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993) (7 pgs.).
Patent Abstracts of Japan vol. 1996, No. 09, Sep. 30, 1996 (Sep. 30, 1996) & JP 08 124069 A (Toyota Motor Corp), May 17, 1996 (May 17, 1996) (15 pgs.).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997) (1 pg.).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997) (1 pg.).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998) (1 pg.).
PCT International Search Report and Written Opinion for PCT/US2016/012757 dated Mar. 18, 2016.
PCT/US2010/022012, Invitation to Pay Additional Fees with Communication of Partial International Search, Jul. 21, 2010. (4 pgs.).
Peter G. Thurlow, Letter (including exhibits) Regarding Patent Owner's Response to Initial Office Action in Ex Parte Reexamination, Mar. 27, 2012. (78 pgs.).
Preliminary Claim Construction and Identification of Extrinsic Evidence of Defendant/Counterclaimant SmartDriveSystems, Inc. in *DriveCam, Inc. v. SmartDrive Systems, Inc.*, Case No. 3:11-CV-00997-H (RBB), for the Southern District of California. Nov. 8, 2011. (13 pgs.).
Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).

(56) References Cited

OTHER PUBLICATIONS

Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
SmartDrives Systems, Inc's Production, SO14246-S014255, Nov. 16, 2011 (1 pg.).
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011. (7 pgs.).
The DriveCam, Nov. 6, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).
Trivinci Systems, LLC, "Race-Keeper System User Guide", V1 .1.02, Jan. 2011, p. 21.
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157, filed Mar. 16, 2006 entitled, "Vehicle Event Recorder Systems and Networks Having Parallel Communications Links" (28 pgs.).
U.S. Appl. No. 11/377,167, filed Mar. 16, 2006 entitled, "Vehicle Event Recorder Systems and Networks Having Integrated Cellular Wireless Communications Systems" (29 pgs.).
USPTO Final Office Action for U.S. Appl. No. 11/296,906, mailed Aug. 8, 2012, 15 pages.
USPTO Final Office Action for U.S. Appl. No. 11/297,669, mailed Nov. 7, 2011, 15 pages.
USPTO Final Office Action for U.S. Appl. No. 12/096,591, mailed Dec. 5, 2014, 23 pages.
USPTO Final Office Action for U.S. Appl. No. 12/096,591, mailed Jul. 18, 2012, 15 pages.
USPTO Final Office Action for U.S. Appl. No. 12/096,591, mailed Nov. 7, 2013, 14 pages.
USPTO Final Office Action for U.S. Appl. No. 13/957,810, mailed Jun. 27, 2014, 22 pages.
USPTO Final Office Action for U.S. Appl. No. 13/957,810, mailed Jun. 27, 2014, 24 pages.
USPTO Final Office Action for U.S. Appl. No. 14/036,299, mailed Feb. 24, 2015, 9 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Apr. 8, 2014, 19 pages.
USPTO Non-Final Office Action for U.S. Appl. No. 11/296,906, mailed Jun. 12, 2012, 13 pages.
USPTO Non-Final Office Action for U.S. Appl. No. 11/296,906, mailed Nov. 6, 2009, 9 pages.
USPTO Non-Final Office Action for U.S. Appl. No. 11/297,669, mailed Apr. 28, 2011, 11 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Apr. 7, 2014, 7 pages.
USPTO Non-Final Office Action for U.S. Appl. No. 11/377,164, mailed Aug. 18, 2014, 5 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 10, 2012, 10 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 27, 2013, 11 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 12/096,591, mailed Jun. 14, 2011, 8 pages.
USPTO Non-Final Office Action for U.S. Appl. No. 12/096,591, mailed Mar. 27, 2013, 16 pages.
USPTO Non-Final Office Action for U.S. Appl. No. 12/096,591, mailed May 20, 2014, 19 pages.
USPTO Non-Final Office Action for U.S. Appl. No. 13/957,810, mailed Apr. 17, 2015, 6 pages.
USPTO Non-final Office Action for U.S. Appl. No. 13/957,810, mailed Nov. 27, 2013, 18 pages.
USPTO Non-Final Office Action for U.S. Appl. No. 14/036,299, mailed Aug. 12, 2014. (14 pgs.).
USPTO Non-Final Office Action for U.S. Appl. No. 11/296,907, Mailed Mar. 22, 2007 (17 pages).
USPTO Non-final Office Action mailed Aug. 27, 2009 during prosecution of U.S. Appl. No. 11/566,424 (25 pgs.).
USPTO Non-Final Office Action mailed Jan. 4, 2016 in U.S. Appl. No. 14/529,134, filed Oct. 30, 2014 (65 pgs).
USPTO Non-Final Office Action mailed Nov. 27, 2013 in U.S. Appl. No. 13/957,810, filed Aug. 2, 2013. (19 pgs.).
Veeraraghavan, H., et al., Computer Vision Algorithms for Intersection Monitoring, IEEE Transactions on Intelligent Transportation Systems, 4(2):78- 89 (2003); Digital Object Identifier 10.1109/TITS2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).
Written Opinion issued in PCT/US07/68328 on Oct. 15, 2007. (3 pgs.).
Written Opinion of the International Searching Authority for PCT/US2006/47042. Mailed Feb. 25, 2008 (5 pages).
Written Opinion of the International Searching Authority for PCT/US2006/47055, Mailed Mar. 20, 2008 (5 pages).
PCT International Search Report and Written Opinion for PCT/IB16/51863, dated Sep. 16, 2016.
"DriveCam Driving Feedback System" DriveCam brochure, Mar. 15, 2004, 4 pages.
"DriveCam Driving Feedback System", DriveCam brochure, Jun. 12, 2001, Document #6600128, 2 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.

(56) References Cited

OTHER PUBLICATIONS

"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Adaptec published and sold its VideoOh! DVD software USB 2.0 Edition in at least Jan. 24, 2003. (1 pg.).
Ambulance Companies Use Video Technology to Improve Driving Behavior, Ambulance Industry Journal, Spring 2003 (2 pgs.).
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424 (13 pgs.).
Anser to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill Siuru, 'DriveCam Could Save You Big Bucks', Land Line Magazine, May-Jun. 2000 (1 pg.).
Bill, 'DriveCam—FAQ', Dec. 12, 2003 (3 pgs.).
Canadian Office Action issued in Application No. 2,632,685 dated Jan. 30, 2015; 5 pages.
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/devnet/flash/articles/vidtemplate_mediapreso_flash8.html (13 pgs.).
Dan Maher, "DriveCam Taking Risk Out of Driving", DriveCam brochure folder, Jun. 6, 2005, 6 pages.
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Del Lisk, "DriveCam Training Seminar" Handout, 2004, 16 pages.
DriveCam Driving Feedback System, Mar. 15, 2004 (12 pgs.).
DriveCam Extrinsic Evidence with Patent LR 4.1 .a Disclosures, Nov. 3, 2011. (1 pg.).
DriveCam Extrinsic Evidence with Patent LR 4.1 .a Disclosures, Nov. 8, 2011. (1 pg.).
DriveCam—Illuminator Data Sheet, Oct. 2, 2004. (1 pg.).
Drivecam, Inc., User's Manual for Drivecam Video Systems' Hindsight 20/20 Software Version 4.0 (2003). (54 pgs.).
DriveCam, Inc.'s Infringement Contentions Exhibit A, U.S. Pat. No. 6,389,340, Document 34.1, Oct. 20, 2011. (10 pgs.).
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit B, U.S. Pat. No. 7,804,426, Document 34.2, Oct. 20, 2011 (20 pg.).
DriveCam, Inc.'s Infringement Contentions Exhibit C, U.S. Pat. No. 7,659,827, Document 34.3, Oct. 20, 2011. (17 pgs.).
DriveCam, Inc.'s Infringement Contentions Exhibit C, U.S. Pat. No. 7,804,426. Aug. 19, 2011. (47 pgs.).
DriveCam, Inc.'s Infringement Contentions Exhibit D, Document 34.4, Oct. 20, 2011. (2 pgs.).

\* cited by examiner

DISTRIBUTED VEHICLE EVENT RECORDER SYSTEMS HAVING A PORTABLE MEMORY DATA TRANSFER SYSTEM

BACKGROUND OF THE INVENTION

Field

The following invention disclosure is generally concerned with vehicle event recorder systems and specifically concerned with data transfer between two primary nodes of a distributed vehicle event recorder system based upon a portable memory data transfer management schemes.

Prior Art

Vehicle event recorders are devices which record data relating to vehicle use on roads and highways, and this recorded data sometimes includes video data captured by a video camera. Data is recorded to a recording medium in an on-board system such as magnetic tape recorders. One well known device used in vehicle event recording systems is a common VHS system. In more modern vehicle event recorders systems, a "hard drive" type storage medium is winning favor as data transfer is greatly facilitated in such systems. In even more sophisticated systems, a high-performance inexpensive semiconductor memory is used to preserve data captured in a triggered vehicle event such as a vehicle crash or other accident.

In all of these cases, it is desirable to transfer information from the car to an administrator's workstation—not part of the vehicle—where the data can be reviewed and analyzed. For many years the most common way to transfer event record data merely meant removing a videotape from a VHS system installed in the trunk of the car and to play the videotape at a similar video player/recorder in an office or laboratory. Police automobiles generally used such systems and many arranged like this remain in widespread use today.

With recent improvements in digital technologies, modern systems are now arranged to record event record data on an on-board digital memory system. Either a hard drive type electro-mechanical memory or a semiconductor memory is suitable for recording data collected in a vehicle event recorder systems. To transfer data from a vehicle installation to an analysis computer, an administrator might plug-in a computer at a service garage to read stored data, Data stored in the vehicle event recorder memory is read by the computer and is sometimes transferred thereto for further processing, In most vehicle fleets using digital recorders today, a download technician goes from car-to-car with a laptop computer each night after vehicles have returned from their service day. It is a tedious task to manually read data from large fleet of vehicles and automated systems are becoming highly desirable.

In exceptionally advanced high-performance systems, a vehicle returning from a service day enters a Wi-Fi envelope or "hotspot", is detected and recognized, and a download operation transfers collected event record data from the vehicle to a centralized server resident memory. Human input is not required and the system is entirely automatic. A driver does not even need to be aware of the system's existence. Merely entering the download space, for example the vehicle parking facility, causes a complete data transfer with regard to any event record datasets captured during use of the vehicle. While these automated systems are state-of-the-art and extremely useful and efficient, they do not address all possible scenarios which remain of considerable interest.

Automated Wi-Fi systems are well suited for use with large vehicle fleets, however they are not always useful for vehicle event recorders arranged for individual or family use. Although Wi-Fi systems are generally available in many homes, in some cases a vehicle is not parked within range of a home Wi-Fi. In addition, not all users of vehicle event recorder systems are interested in configuring them for use in conjunction with a home Wi-Fi. In these cases it is desirable to provide for an easy and efficient data transfer scheme which does not require installation and maintenance of complex computing network equipment.

Even though high-performance vehicle event recorders used in these systems have a resident memory and that resident memory is specifically provided to store a plurality of event record datasets, for example even up to more than 100 event record datasets, the memory is not suitable for archiving data for extended periods. It is preferable to transfer event record data from the vehicle event recorder to a station where that data can be stored in a more permanent and secure fashion. Further, as vehicle event recorders do not provide for replay and analysis of event record data as they include no facility for that, it is intended that a vehicle event recorder capture data and preserve it in the short-term with the intention of transforming it to cooperating systems at a later time in a data transfer process.

While systems and inventions of the art are designed to achieve particular goals and objectives, some of those being no less than remarkable, these inventions have limitations which prevent their use in new ways now possible. Inventions of the art are not used and cannot be used to realize the advantages and objectives of the systems disclosed herefollowing.

SUMMARY OF THE INVENTION

Comes now, James Plante and Ramesh Kasavaraju with invention of distributed vehicle event recorder systems including devices and methods for transfer of data between nodes via a specially prepared portable memory.

Vehicle event recorder data transfer systems are devised and arranged about a portable memory device and scheme. In best modes, a "flash" type semiconductor memory device with a USB interface is provided to operate in conjunction with cooperating upload/download modules one each respectively in a vehicle event recorder and a remotely located application-specific server.

A download module of a server computer reads event record data information from a portable memory and marks the portable memory at a transfer status file to indicate successful data transfer has occurred. When the portable memory with the transfer status file is returned to the vehicle event recorder, the vehicle event recorder upload module checks the transfer status file and deletes data in the vehicle event recorder resident memory in accordance with information provided. In this way, only the event records which have been successfully transferred to the server datastore memory are subject to removal at the vehicle event recorder resident memory.

Vehicles equipped with vehicle event recorders of these inventions freely travel about roads and highways. In accordance with prescribed conditions, a vehicle event recorder may capture vehicle operation data in response to a detected or declared "event". Vehicle operation data may include numeric data provided by various of many vehicle sensors, in particular via an on-board controller area network, and in addition video data captured by an on-board video camera, part of a vehicle event recorder. When an event is declared, for example in collision where a shock detector exceeds a prescribed threshold, data is stored in a discrete event record dataset. The event record data is stored in a local or resident memory arranged with a capacity to hold tens or hundreds of similar event record datasets. While the resident memory of the vehicle event recorder is suitable for storing a great plurality of event record datasets it is not unlimited and the storage is to be considered temporary. At some point, data is copied to a more permanent system for analysis and archiving. To promote ease of data transfer, these vehicle event recorders are provided with a communications port suitable for coupling with a portable memory. In some best versions, a portable memory is arranged as a flash type semiconductor memory provided with a USB interface, a type "A" male connector for example. Accordingly, a vehicle event recorder is provided with the complementary type "A" female USB interface in preferred versions. Alternatives are possible. It is easy to appreciate that these systems arranged in conformance with the "CompactFlash" specification would work similarly well. Also, a standard known as "Secure Disk" provides a sufficient solution.

A vehicle event recorder provided with a USB communications port as described and further with supporting apparatus (upload module) to effect a data transfer between a resident memory and the portable memory, is suitable for use in conjunction with the spirit of this teaching. A vehicle having a vehicle event recorder as taught here involved in one or more events may be coupled to a USB flash type portable memory upon returning to a rest at the termination of a journey. The upload module detects the presence of the so coupled portable memory, checks a transfer status file, copies new event record data to the portable memory, removes old event record data at the vehicle event recorder resident memory as indicated in the transfer status file, or other suitable indicators, to have been successfully passed to a server for long-term storage. After new event record data is copied to the portable memory, a copy remains in the vehicle event recorder resident memory, the portable memory is transferred to the application-specific server computer system. The server computer is necessarily running a service (download module) which anticipates the arrival of the particular portable memory having recorded event record data thereon. General purpose computers not programmed with the special feature of a download module will not properly respond to insertion of the portable memory and will take no action necessary to properly handle these event record dataset files. When a portable memory does arrive at a prescribed and so prepared application specific server computer, the download module transfers/copies new event record data, verifies the integrity of the transfer, and finally prepares and writes a transfer status file to the portable memory to reflect the success or failure of a download with regard to each event record. When the portable memory is returned to vehicle event recorder, the transfer status file is interrogated such that the vehicle event recorder upload module can safely erase or overwrite memory allocated to event data no longer in need of protection due to successful transfer to the server.

The memory may be shuttled from and to between the vehicle event recorder and the server and in each step, the event records are transferred to the server and erased from the vehicle event recorder in agreement with the transfer status file as understood by the upload module of the vehicle event recorder and the download module of the server computer.

While the memory may be essentially the same as any other portable memory, the system distinguishes the memory by way of the transfer status file or other indicators of file transfer status. When a memory system not part of this invention (i.e. the transfer status file is absent) is inserted to either the vehicle event recorder or the server it will be interpreted by those devices as memory not part of this data transfer system.

Objectives of the Invention

It is a primary object of these inventions to provide vehicle event recorders in a distributed arrangement with data transfer mechanisms between primary nodes.

It is an object of these inventions to provide a coupling between a vehicle recorder system and an application specific remote server computer via a portable memory.

It is a further object to effect safe and reliable data transfer schemes between a vehicle and a cooperating server computer arranged as part of a vehicle event recorder system.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

GLOSSARY OF SPECIAL TERMS

Figure 1:
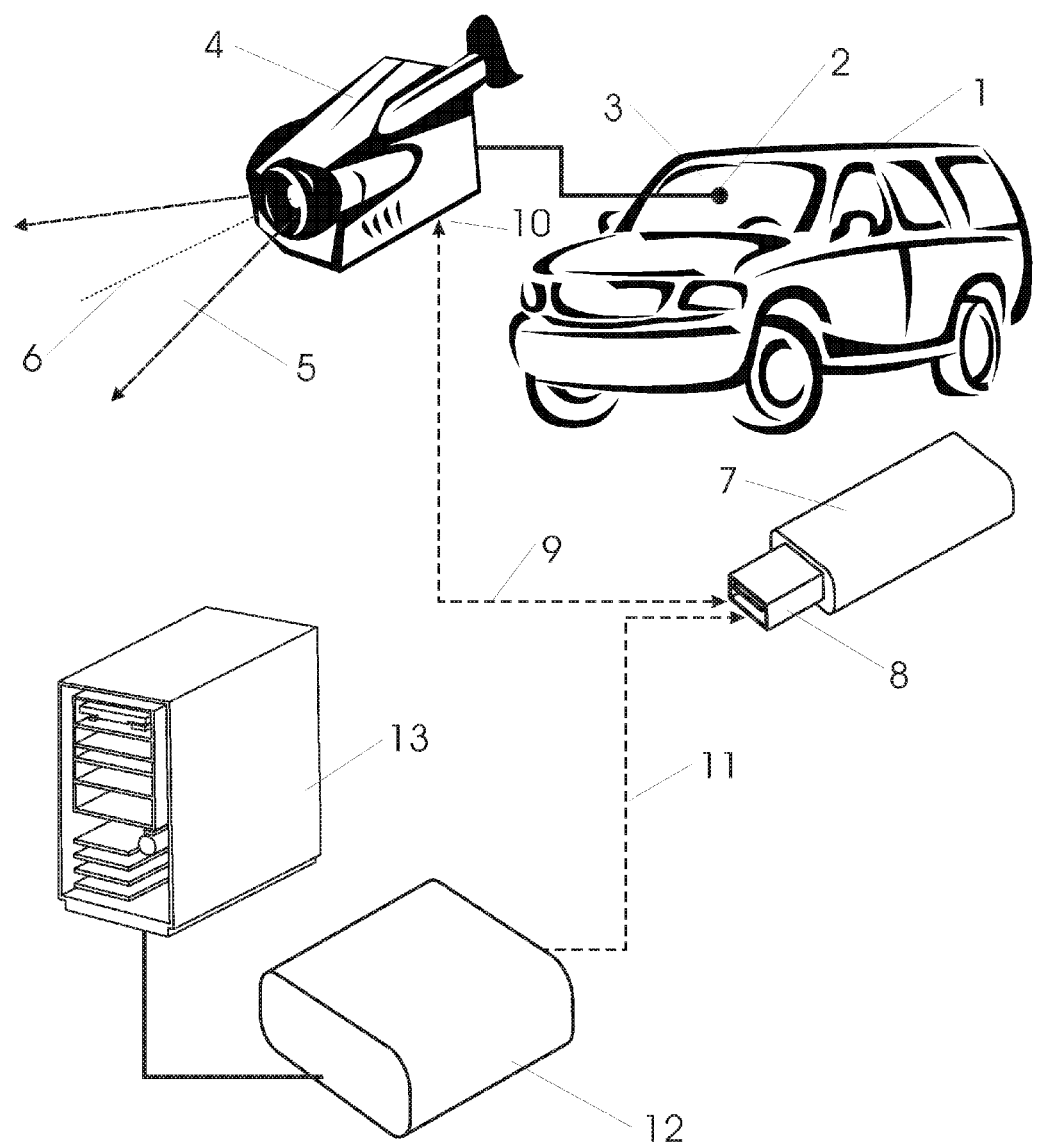
FIG. 1 is a perspective schematic drawing of an example version of a distributed vehicle event recorder system of this teaching; thereof.

Throughout this disclosure, reference is made to some terms which may or may not be exactly defined in popular dictionaries as they are defined here. To provide a more precise disclosure, the following term definitions are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Vehicle Event Recorder (Systems)

Vehicle event recorder systems are systems for recording data related to vehicle use including a video event recorder and supporting and cooperating apparatus.

Resident Memory

For purposes of the following disclosure and teaching, a 'resident memory' is memory installed as part of an on-board vehicle event recorder.

Portable Memory

Portable memory is a small lightweight self-contained memory system arranged with facility which permits quick coupling and decoupling with cooperating systems.

Datastore Memory

For purposes of this disclosure, a datastore memory is a highly durable memory system suitable for long-term storage of digital data.

DETAILED DESCRIPTION OF THE INVENTION

Most generally a system in accordance with this teaching includes: an on-board vehicle event recorder, a portable memory device, and a cooperating remote server computer. In this arrangement, the on-board vehicle event recorder is entirely free from and without connection to the server. As such, a vehicle is completely free to travel without regard to any link or restriction with respect to a cooperating server. In contrast to on-board vehicle event recorder which couple with a server via a radio "hotspot" when the vehicle returns to a prescribed parking facility, the following systems do not require, a vehicle to return to a designated parking facility to effect download operations.

A portable memory is fashioned as a small lightweight and durable device easily handled by human operators and conveniently stored and transported as a self-contained system. A small plastic or metal case provides a durable container for a small digital memory system which may be installed and provided therein. In some versions, the digital memory system is preferably provided as semiconductor "flash" type memory. Semiconductor memory arranged as a non-volatile flash system provides a reliable memory system without moving parts. It is highly durable, small in size and inexpensive. Additionally, it does not require maintenance and operates for a very large number of cycles in a lifetime; it is safe to discard when its life has finally expired.

Alternatively, a portable 'hard drive' type memory system is a competing system which is particularly attractive in schemes where very high data storage capacity necessary. Hard drive systems having a capacity up to 100 GB are available in a portable package about the size of a deck of playing cards. Where transfer of very large amounts of data is required, versions may adopt these electro-mechanical memory systems characterized as a 'hard drive'.

In either case, a semiconductor memory or electro-mechanical hard drive memory, these systems are additionally provided with an interface system. Memory permanently installed in cooperation with typical computer systems do not require such interface systems. However as a portable memory is distinguished by its ability to repeatedly couple, and decouple from a communications port, a special interface suitable for supporting such coupling/decoupling is highly desirable in these systems. In a most preferred version, a portable memory is provided within a durable case and further communicatively connected to a Universal Serial Bus, USB type interface or commonly USB 'connector'. The USB type interface includes both a mechanical and communication protocol standard. The memory is joined with the physical connector such that when connection is made with a cooperating system, data from the memory is passed via the USB interface system and further into the connected device.

A USB interface is particularly attractive as it works well with either a flash semiconductor memory or an electro mechanical hard drive memory system. While certain flash devices are formed about their own useful connector interface standards, it would be unusual to adopt those standards in conjunction with a hard drive. However, both hard drive and flash memory systems are easily adopted to work with a USB interface. Adopting a USB interface is therefore attractive which it is desirable to enable systems for use with either flash type and hard drive type potable memory systems.

While USB is an important preferred arrangement, it is sometimes useful to adopt alternative interface systems which cooperate well with portable memory so long as it additionally cooperates well with a vehicle event recorder and related server computer more important example, a system known as a "Compact Flash" is a semiconductor memory with an included mechanical interface and a very compact included package. The Compact Flash standard accounts for both the package and the interface. Two rows of 25 connector sockets or receptacles (female) receive therein a cooperating arrangement of wire posts or studs (male). The memory is coupled to a cooperating system merely by aligning the connectors and pushing them together such that electrical contact between studs and receptacles is made. Pins are sometimes exposed to forces which tend to bend or otherwise cause damage to the connector. Otherwise, the Compact Flash standard is an excellent candidate about which these systems might be based.

A very similar portable flash memory arrangement is provided via a competing standard known as "Secure Digital". Secure Digital flash includes a more durable connector arranged as a planar compound connector of 18 elements arranged in a spatial distribution which mates with a suitable receiving unit. As such, there are no pins to bend or otherwise damage. Accordingly, the Secure Digital connector is an excellent candidate for these systems which might demand a large number of coupling/decoupling cycles.

Either standard including the Compact Flash or Secure Digital flash work quite well in various versions of systems presented here which include portable memory arranged as flash type semiconductor memory. The interfaces associated with Compact Flash and Secure Digital are useful with a semiconductor potable memory, but are not generally used with hard drive systems—although they are not necessarily excluded as such and are explicitly anticipated here.

While the flash memory interfaces described are well known and in widespread use, these interfaces cooperate particularly well with vehicle event recorders. A special synergy exists between a vehicle event recorder system and these portable memories. Vehicle event recorders have attributes associated therewith which are not part of other systems where such portable memory is used. Accordingly, there is a special advantage to be realized when choosing memory interfaces for use in cooperation with vehicle event recorders which is not obvious with regard to memory selection for portable music players or digital cameras for example. Portable music players and cameras are not generally mounted rigidly in a fixed position in close proximity to a large substantially planar or concave immovable object (i.e. a windshield). Accordingly, vehicle event recorders have access restrictions which demand that only certain types of systems be coupled therewith. As such, interfaces which permit good coupling of portable memory to vehicle event recorders without requiring disturbance of the vehicle event recorder with respect to its mount are particularly useful. Use of these interfaces include benefits not found in more common uses of portable memory.

Vehicle event recorders of these systems include video recorders coupled to capture video images which relate to vehicle use. Traffic views, views of the operator space, among possibly others, may be captured by digital imaging devices or 'video cameras'. Vehicle event recorders are most preferably mounted behind a windscreen near its upper center. For this arrangement, the device may be optically coupled to the spaces ahead of the vehicle in the direction of travel, and by way of a rear-view camera, simultaneously to the vehicle operator compartment. To effect this it is best if the device is mounted near and quite rigidly to the windshield in the interior portion of the vehicle driver's compartment. In such position, physical access to the device is somewhat compromised. In some cases, a rear-view mirror further restricts access. However, with an appropriately placed and arranged communications port interface, a portable memory can be operably coupled to the vehicle event recorder in its fixed position such that it is easy for an unskilled operator to couple and decouple a portable memory thereto.

In particular, a USB connector is well-suited because establishing a connection requires just a little force. Interfaces requiring large forces tend to disturb the alignment of the cameras axes and should be avoid ed. In addition, the physical connector is quite small and only requires a translation or movement of about 1 cm to make the connection. In the constrained spaces associated with typical vehicle event recorder installations, this is a useful advantage. Although a CompactFlash electrical connector requires a bit more force, the required 'throw' is small. Additionally, CompactFlash connectors can be arranged with cooperating mechanical means (levers and alignment indices) to promote good alignment and more certain physical coupling. Secure Disk type flash connectors similarly require little space to couple and decouple a portable memory to a vehicle event recorder having obstructed access due to its installation configuration.

Each of these three mentioned interface systems, USB, Compact Flash, Secure Digital among some others cooperate well with the physical nature of an installed server and workstation computers and of their peripheries which may include those to couple with such portable memory systems. The server and workstations computers portion of these networks may be arranged as a typical computer installation with prescribed application specific software. As such, without special structural arrangement these systems support complete use with portable memories in the arrangements proposed above. A server computer couples and decouples in a conventional way with a portable memory via standard peripherals which are commonly available.

Thus one best version of the invented body includes a vehicle event recorder system of the following components in combination: a vehicle event recorder, a portable memory and a remote server computer. Further these components include an arrangement where the portable memory is fashioned with a single interface to couple with both the vehicle event recorder and a server computer. Still further, that it may be repeatedly coupled and decoupled from either the vehicle event recorder and server computer by way of a mechanical aspect of a provided interface system.

Preferred Embodiments of the Invention

The following presentation is provided including illustrative examples and includes description relating to ways to make and use the systems. It will be appreciated that each of the embodiments described include an apparatus and method and that the apparatus and method of one preferred embodiment may be different than the apparatus and method of another embodiment. Accordingly, limitations presented in one example should not be carried forward and implicitly assumed to be part of an alternative example.

With reference to the drawing figures, one will appreciate further detail of these distributed vehicle event recorder systems and the connections between its primary elements by way of a portable memory system. FIG. 1 illustrates important general versions and relationships between primary components thereof. A vehicle 1 is prepared with an on-board video event recorder 2 affixed and mounted therein. Just behind the vehicle windshield 3 in an upper central region, a vehicle event recorder may be rigidly fastened thereto such that a video camera 4 has its field-of-view 5 and optic axis 6 pointing forward into traffic. Because the vehicle event recorder is fully self-contained receiving power from the vehicle and provided with a resident memory, the device is operable despite being completely disconnected and not in communication with any computer network or power grid. As such, the vehicle is free to travel any place a vehicle might go without regard to a network connection.

A portable memory 7 is formed of a protective shell or casing, a connection interface 8 and an internal electronic or electro-mechanical memory system, for example semiconductor the flash memory or spinning disk hard drive. The interface depicted in the drawing is in conformance with the USB standard type "A" type connector. As such, it may be connected to and coupled with 9 cooperating systems having complementary "A" type USB connectors. A vehicle event recorder fitted with a communications port including a similar but opposing gender USB connector 10 permits the portable memory to be connected to the vehicle event recorder whereby data may be passed in both directions; that is from the vehicle event recorder to the portable memory and in the other direction from the portable memory to the vehicle event recorder.

In particular, event record dataset files in the vehicle event recorder resident memory may be copied to the portable memory for later transfer to a cooperating server computer. Further, control files or other file transfer indications can be transferred from the portable memory to the vehicle event recorder (not necessarily to the resident memory systems but rather they may be merely read by a microprocessor and used in at a local RAM). The same portable memory device when decoupled from the vehicle event recorder is suitable for easy transport—i.e. it is no longer connected to the vehicle and is free to be carried to places where vehicles could not normally go. The portable memory may be coupled 11 to a computer periphery system such as a Compact Flash reader device, or alternatively a simple USB port 12. The USB port including both electro-mechanical connection and communications protocol permits the portable memory to be coupled to the server computer 13 in a similar manner that it is connected to the vehicle event recorder.

To bring about this relationship, the mechanical portion of the interface is arranged such that the gender of the vehicle event recorder connector and the server computer connector are the same and the gender of the portable memory connector is the opposite of those two. Accordingly, the same portable memory system can be coupled with the vehicle event recorder and the server computer.

Figure 2:
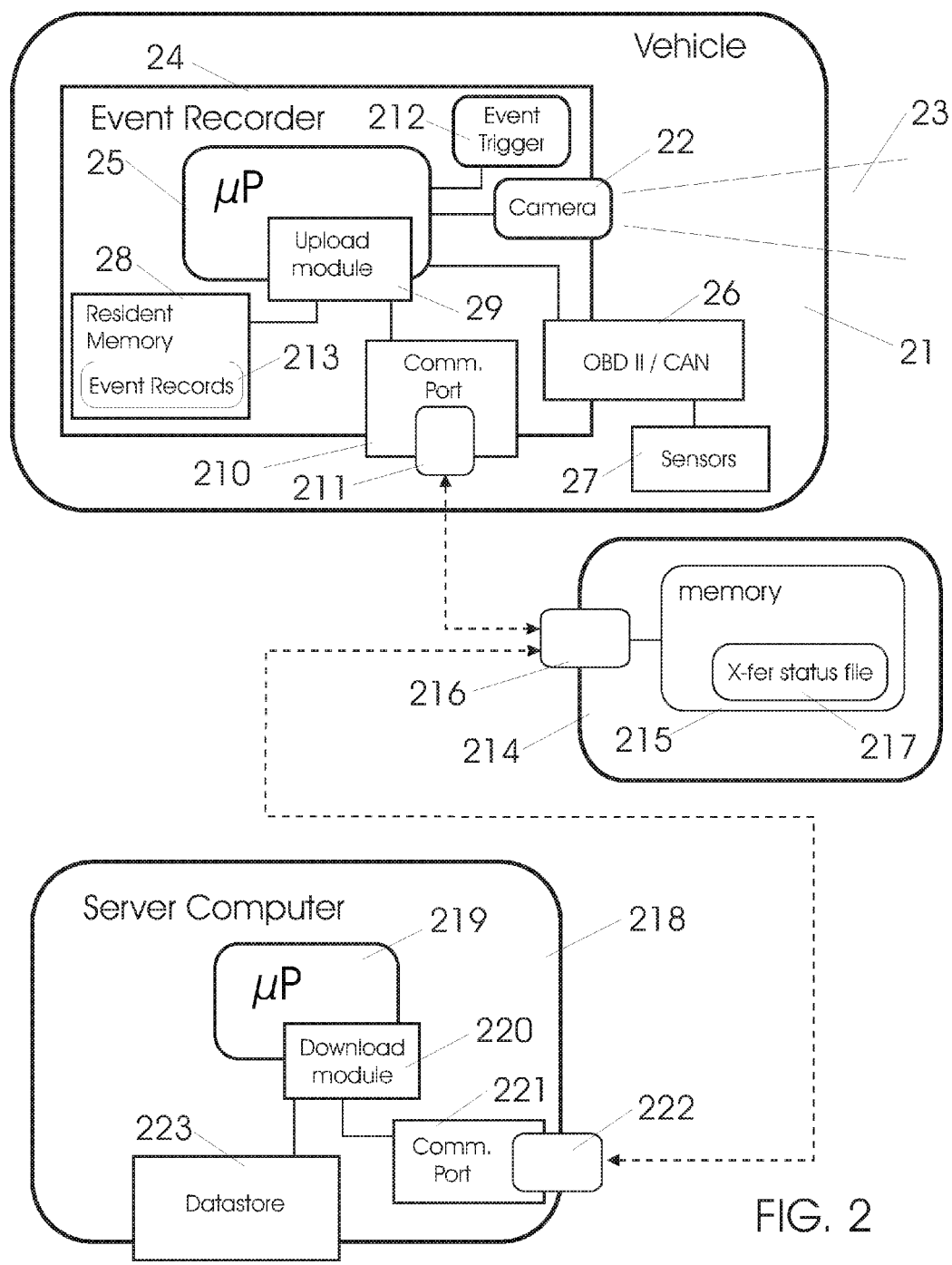
FIG. 2 is a detailed block diagram of these systems including major components

The block diagram of FIG. 2 presents the system in greater detail. A vehicle 21 equipped with a vehicle event recorder is mounted and affixed behind the windshield of a motor vehicle whereby a video camera 22 field-of-view 23 is coupled to an environment about the vehicle, for example a traffic view or a vehicle operator view. The vehicle event recorder 24 having primary components including: a microprocessor or microcontroller 25; in some versions, a data acquisition system standard in most vehicles, an on-board diagnostic system 26; and associated sensors 27; a resident memory system 28; an upload module 29; a communications port 210; having an electro-mechanical interface 211, is preferably arranged as shown in the diagram. An event trigger 212 sets into motion a process where an event record 213 is created and stored in the resident memory, These elements are in cooperation and work in concert with each other—more particularly as illustrated by the indicated pathways presented in the drawing. That is, sensor transducers provide signals to a controller area network or on-board diagnostic system; and those signals are further received at the vehicle event recorder microprocessor. Similarly a camera provides data, in particular video data relating to vehicle use, to the microprocessor. Event records stored in memory can be passed by and upload manager via a communications port to an external memory, a portable memory which may be removed thereafter from the vehicle event recorder for transport to cooperating stations.

Portable memory device 214 formed of a protective shell and case, additionally a memory core 215 which is preferably arranged in best systems as a flash semiconductor memory, and a communications port interface 216. The interface is provided such that the portable memory can be coupled to the vehicle event recorder and other systems. In some best versions, indicators 217 may be provided in the memory such that upload and download managers can determine the transfer status of particular event record datasets. Thus, in some versions a portable memory is distinct because it includes means to facilitate and assure proper upload/download actions.

Finally a server computer 218 including a microprocessor 219 and closely coupled download manager 220 is electronically coupled to communications port 221 which includes a suitable electro-mechanical interface 222. which matches, albeit with opposing gender, to that of the portable memory. A datastore 223 provides long-term archiving and secure storage of event record data. Review and analysis may be taken up against event records captured by a vehicle and be performed at the server or connected workstations at any time without regard for any connection to the vehicle in which data was acquired.

For a more complete understanding the following description is provided to address actions taken when a portable memory is coupled and decoupled to a VER and cooperating server computer. When a portable memory is introduced at the communications port of a vehicle event recorder, its presence is detected automatically and its presence triggers a data transfer action. A vehicle event recorder upload module looks for and attempts to read a transfer status file or other indicators on the portable memory.

Transfer status indicators are provided to signal whether a successful data transfer has occurred for each of a plurality of event records. Event records in the vehicle event recorder resident memory which previously have been successfully transferred (copied) to the server computer as indicated by an event record identity or handle as part of the transfer status file of the portable memory are then marked by the upload module for an erase operation, overwrite operation, or otherwise "okay for obliteration".

Once a portable memory is removed from the communications port at the vehicle event recorder, it is portable and free to be moved to remote systems. The portable memory is thereafter coupled with a prescribed server equipped with a communications port suitable for receiving portable memory therein. Similarly with respect to the vehicle event recorder, a specially configured download module at the server detects introduction of the portable memory and executes operations particular to these systems. That is, the memory is searched for new event records; i.e. event records not present in the server datastore memory. Where these event records are found, a transfer step moves and/or copies them to the server memory, while not essential, it is sometimes preferred that the portable memory is cleared of data (erased) after a transfer has occurred. Transferred data might be checked against the data in the portable memory in a data integrity verification step. After it is verified that the data transferred to the server computer is whole, the portable memory can be manipulated. In one such operation, an event record transfer status file may be written to the portable memory. A transfer status file includes indication for each event record that the data was successfully transferred, or not. This may be taken up as a binary indicator being associated with any particular identifier or handle. When the portable memory is returned to the vehicle event recorder, the upload module there can act upon and respond to the indicators provided in the event record transfer status file.

Figure 3:
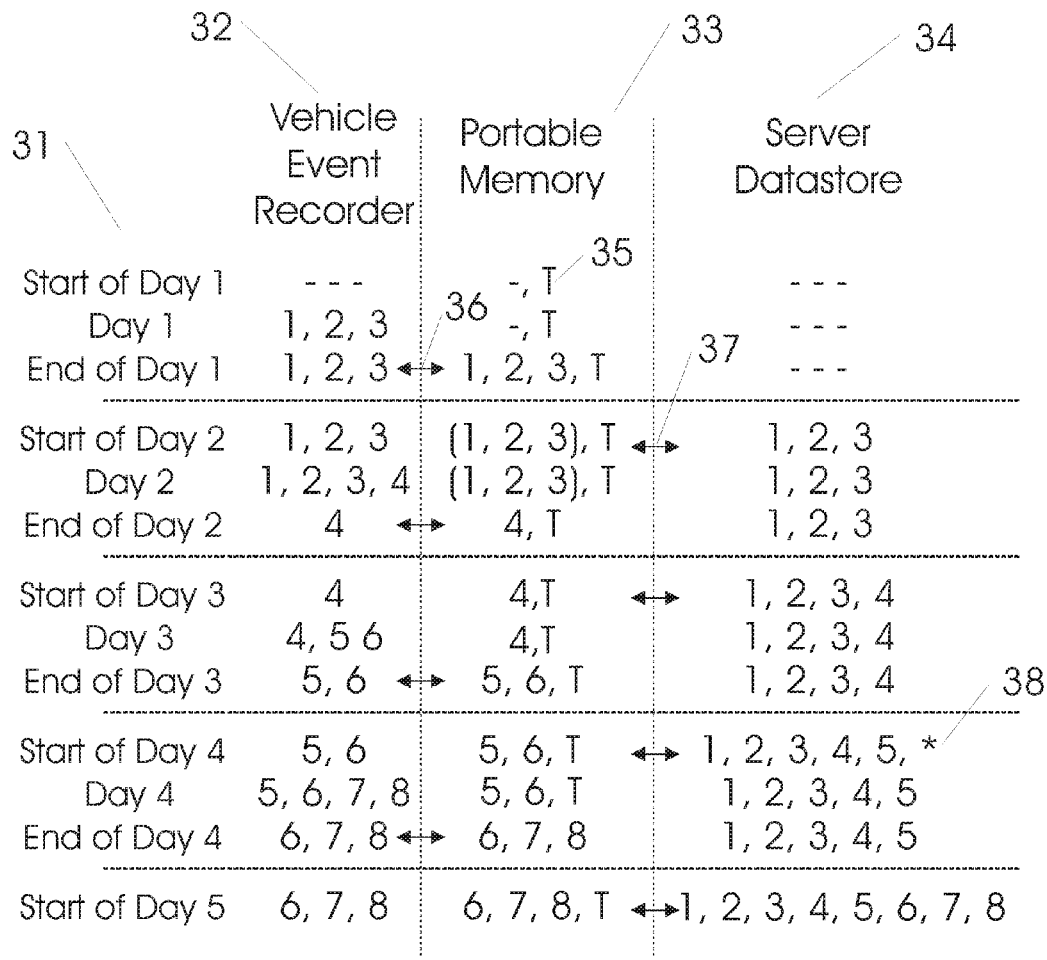
FIG. 3 is a general flow diagram of methods first proposed herein.
Figure 4:
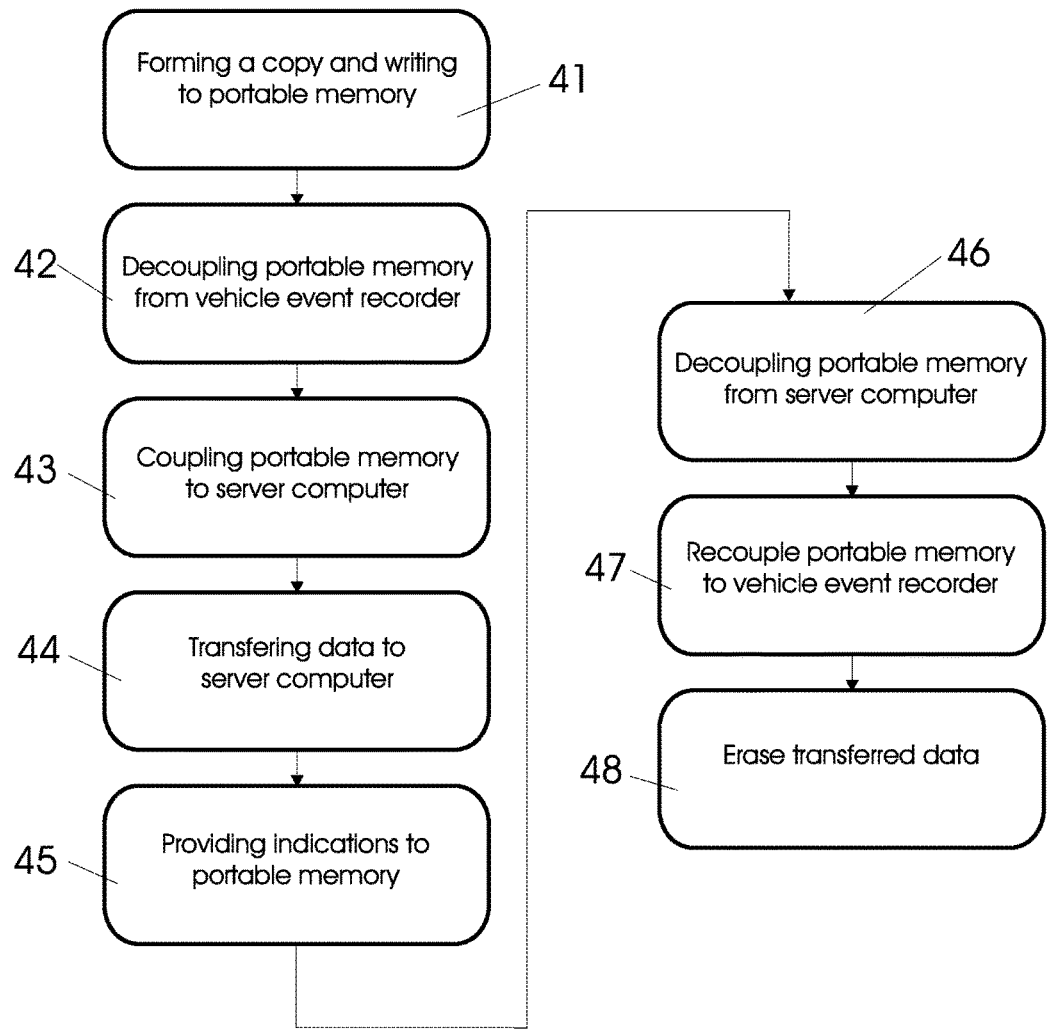
FIG. 4 is matrix description of a timeline illustrating the memory states of three key components.

The following example is provided to illustrate use of the system with particular regard to a file transfer timeline (represented as column 31 in the Figure). With reference to the matrix presented as FIG. 3, the illustration assumes the following: 1) each day a vehicle with a vehicle event recorder goes out and is exposed to traffic events; 2) at the end of each of service today, the vehicle event recorder is coupled with a prescribed portable memory; 3) at the beginning of each service day the portable memory is coupled to an application-specific server computer.

On the start of the Day 1, the resident memory of the vehicle event recorder 32, the portable memory 33 and the server computer datastore memory 34 are all empty and contain no event record data. (However the portable memory may be initialized with a special service file to indicate its authority to both the vehicle event recorder and the server). During the first use of the vehicle on Day 1, three event record data sets ER 1, ER2, and ER3 (indicated in the drawing as 1, 2, 3) are recorded and written to the resident memory of the vehicle event recorder as the vehicle is in use and as the events occur.

At the end of Day 1, the portable memory is connected 36 to the vehicle event recorder by way of its USB communications port. Event record data is copied from the vehicle event recorder resident memory to the portable memory. The upload module first detects the presence of the portable memory, checks its authorization to ensure it is a memory in conformance with the task at hand, and copies event record data to the portable memory. ER1, ER2 and ER3 are copied to the device. After the upload is completed, the portable memory contains ER 1, ER2, and ER3. In addition, it contains the transfer status file T. The server memory remains empty at the end of the Day 1. The portable memory is decoupled from the vehicle event recorder.

At the start of Day 2, the portable memory is coupled 37 to the server at a communications port having a compatible interface. A download module running as a service on the server computer detects the presence of a portable memory, authenticates it as a vehicle event recorder related device, copies its event record data to a server datastore, verifies the integrity of the copied data, and writes a transfer status file to the portable memory. In this example, all three event record's ER 1, ER2, and ER3 are successfully transferred and that is indicated in the transfer status file. At the start of Day 2, the vehicle event recorder memory has ERL ER2, and ER3, the server has ER 1, ER 2, and ER3. The portable memory has an updated transfer status file [provided by the server computer after the successful download. It is optional whether or not the portable memory preserves the event record data—that is, it may be erased or left intact without effect. During the Day 2, the vehicle encounters another event, and the fourth event record is written to the vehicle event recorder resident memory—ER4, As such, the vehicle event recorder memory includes the following data late in Day 2: ER 1, ER2, ER3, and ER4. Although ERI, ER2, and ER3 have been copied to the server, they (a copy) remain in the vehicle event recorder resident memory.

Until the portable memory is returned to the vehicle event recorder and interrogated for indications which suggest the success or failure of file transfers, a copy is maintained in the portable memory. When the portable memory is reintroduced to the vehicle event recorder (at the end of Day 2), the upload module reads indicators at the portable memory to learn successful download has occurred with respect to ER 1, ER2, and ER3; accordingly, the upload module clears memory space previously occupied by data of ER1, ER2, and ER3. The only event record data remaining in the resident memory is that of ER4. A copy of ER4 is made to the portable memory by the upload module. Server data store maintains its copy of ER 1, ER2, and ER3. At the start of Day 3 when the portable memory is re-connected to the server computer the server computer sees ER4, knows it is a new event record not present in the datastore, and downloads a copy, verifies its integrity, and prepares a transfer status file 'T' with indicators that a successful transfer has occurred.

When the portable memory is returned to the vehicle event recorder at the end of Day 3, ERA is erased as the upload manager learns of the earlier successful transfer at the server computer. In addition, copies of newly acquired event ER5 and ER6 are written to choose the portable memory. At the start of Day 4 when the portable memory is connected to the server an attempt is made to download event record's ER5 and ER6; however although ER5 downloads correctly, ER6 fails (for purposes of this example) as indicated by the asterisk 38. The transfer status file is marked to indicate successful transfer of ER5 and an error (or silence) with regard to ER6. When the portable memory is reintroduced to the vehicle event recorder, it detects (from examination of indicators in the transfer status file) that ER6 was not properly received. Accordingly, the upload module responds by writing a new copy of ER6 to the portable memory. In addition, as newly acquired event record's ER7 and ER8 now are in the vehicle event recorder resident memory, they too are copied to the portable memory at the end of Day 4. At the start of Day 5, ER6, ER7, and ER8 are copied to the server datastore. The server datastore then has a complete library of event records ERI-ER8 despite one transfer error having occurred. This example illustrates the power of the system to ensure all event records arrive safely at server computer before they are erased at the vehicle event recorder.

Methods in accordance with systems taught here are readily understood in view of the detailed disclosure herefollowing. In a first step, event records which have been collected over a brief and finite period of time, for example a single vehicle service today or perhaps several days, is copied 41 from the vehicle event recorder resident memory to a portable memory which has been temporarily coupled to the vehicle event recorder at a communications port provided therein. An upload manager (an upload manager is the portion of an upload module which executes coded logic instructions) may be triggered to perform such upload action upon introduction of a portable memory at the communications port. The upload manager examines a newly introduced portable memory for indications of previous data transfer and responds to these indications by removing data remaining in the vehicle event recorder resident memory to free space for event records to occur in the future.

Thereafter, the upload manager reviews information stored locally in the resident memory to see if there exist any event records which may have not yet completed a successful transfer to the server. In the case that event record data exists, a copy is formed and that copy is written to the portable memory. In some versions, a control file is made to indicate which files are the files newly added to the portable memory. Other indicators may be provided.

In a following step 42, the portable memory is disconnected or decoupled from the vehicle event recorder. Because of its highly portable nature, it may be easily transported to any location and the data of the portable memory is free and no longer confined and bound to the vehicle which otherwise restricts its ability to be used at a server computer.

The portable memory after being suitably transported to a prescribed server computer or workstation, is coupled 43 therewith. The device may be inserted or otherwise "plugged-in" such that a communications path is enabled between the portable memory and the server computer. Server computers of these systems are specifically programmed to receive vehicle event record data. A download module detects newly presented memory devices at the communications port. If the memory inserted is merely a standard memory with no event record datasets and no control files thereon, the download manager takes no further action and the portable memory is treated as if it is not part of the system but a general purpose memory suitable for common uses.

The down load module interrogates the attached portable memory to learn whether it contains new event record files not previously downloaded. If that is the case, the download module sets into action a transfer 44 of new event record datasets to the server and connected datastore memory. Once files are copied over to the server, the integrity of the files is checked. Where files are verified transferred in good order, the portable memory is modified 45 to include indicators of that. That is, an event record-by-event record indication of success is written to the portable memory. Where a file transfer failure occurs, an event record is not marked as successfully transferred and it is subject to being re-loaded in the next cycle. In a future cycle, the memory is decoupled 46 from the server computer, recoupled to the vehicle event recorder 47. The resident memory of the vehicle event recorder can then be cleared 48 of all data indicated as successfully transferred. One will appreciate that as a copy remains in the resident memory at the vehicle event recorder, it can be replaced in a future transaction. This scheme assures that data files are not removed from the vehicle event recorder until they have been verified as being successfully transferred to the server. The portable memory is free to be decoupled from the server and returned to the vehicle event recorder. When the portable memory is reinserted into the vehicle event recorder can indications for, the upload module discovers the file transfer status, fix example by interpreting indications provided in a transfer status file.

The examples above are directed to specific embodiments which illustrate preferred versions of devices and methods of these systems. In the interests of completeness, a more general description of devices and the elements of which they are comprised as well as methods and the steps of which they are comprised is presented herefollowing.

One will now fully appreciate how distributed vehicle event recorders having a plurality of nodes may be coupled together in a data transfer coupling by way of a portable memory system including both apparatus and methods. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. A vehicle event recorder system comprising:
a camera configured to capture image data, wherein the camera has a field of view arranged to include an environment in and/or around a vehicle, wherein the camera is configured to be mounted in the vehicle;
one or more sensors configured to generate output signals conveying vehicle information related to operation of the vehicle, wherein the one or more sensors are carried by the vehicle;
resident memory configured to electronically store information, wherein the resident memory is carried by the vehicle;
a microprocessor configured to:
detect vehicle events based on the generated output signals,
create event record datasets responsive to detection of the vehicle events, wherein the event record datasets include the captured image data and the vehicle information, and
effectuate storage of the event record datasets in the resident memory, wherein the event record datasets include a particular event record dataset;
a communications port configured to facilitate communication between the resident memory and an external computing system;
the external computing system comprising:
storage configured to electronically store information,
an external system communications port configured to facilitate communication with the communications port, and
a download module communicatively coupled to the storage and the external system communications port, wherein the download module is configured to facilitate transfer of information via the external system communications port to the storage, wherein the download module is further configured to transmit an indication through the external system communications port, wherein the indication indicates that the particular event record dataset has been successfully stored in the storage; and
an upload module communicatively coupled to the resident memory and the communications port, wherein, responsive to receiving the indication from the download module, the upload module of the vehicle event recorder is configured to cause the resident memory to mark the particular event record dataset for erasing and/or overwriting.

2. The vehicle event recorder system of claim 1, further comprising:
an on-board diagnostics system configured to associate data provided by the on-board diagnostic system with captured image data, and wherein the event record datasets include data provided by the on-board diagnostic system.

3. The vehicle event recorder system of claim 1, wherein the communications port includes an electromechanical coupling operable for repeated coupling and decoupling.

4. The vehicle event recorder system of claim 1, wherein the external system communications port includes an electromechanical coupling operable for repeated coupling and decoupling.

5. The vehicle event recorder system of claim 1, wherein the communications port includes a first electromechanical coupling operable for repeated coupling and decoupling, wherein the external system communications port includes a second electromechanical coupling operable for repeated coupling and decoupling, and wherein the first electromechanical coupling is configured to couple with the second electromechanical coupling.

6. The vehicle event recorder system of claim 5, wherein the first electromechanical coupling conforms to protocol and structure defined in at least one of USB flash, CompactFlash, and Secure Disk flash.

7. The vehicle event recorder system of claim 1, wherein multiple indications that indicate successful storage of multiple corresponding event record datasets are included in a computer readable control file.

8. The vehicle event recorder system of claim 1, wherein the upload module is further configured to process the computer readable control file.

9. The vehicle event recorder system of claim 8, wherein the download module is further configured to process the computer readable control file.

10. The vehicle event recorder system of claim 1, wherein the resident memory includes portable memory.

11. The vehicle event recorder system of claim 1, wherein the download module is further configured to transmit a second indication through the external system communications port, wherein the second indication indicates that the particular event record dataset has not been successfully stored in the storage, wherein, responsive to receiving the second indication from the download module, the upload module of the vehicle event recorder is further configured to retransmit the particular event record dataset from the resident memory via the communications port.

12. The vehicle event recorder system of claim 1, wherein the particular event record dataset corresponds to a collision.

* * * * *